United States Patent [19]

Burger et al.

[11] Patent Number: 4,611,843
[45] Date of Patent: Sep. 16, 1986

[54] GRIPPER FOR A MANIPULATION DEVICE FOR AN INDUSTRIAL ROBOT

[75] Inventors: Rudolf Burger; Franz Kobras; Gerd Kohler; Erich Niedermayr, all of Munich; Josef Poessinger, Ettal, all of Fed. Rep. of Germany

[73] Assignee: Siemens Aktiengesellschaft, Berlin & Munich, Fed. Rep. of Germany

[21] Appl. No.: 632,472

[22] Filed: Jul. 19, 1984

[30] Foreign Application Priority Data

Sep. 27, 1983 [DE] Fed. Rep. of Germany ....... 3334967

[51] Int. Cl.$^4$ .............................................. B25J 15/00
[52] U.S. Cl. ................................ 294/86.4; 294/103.1; 294/907; 901/31; 901/46
[58] Field of Search ...................... 294/86.4, 88, 103.1, 294/907; 269/32, 228; 414/751; 901/31, 37, 39, 46

[56] References Cited

U.S. PATENT DOCUMENTS

| | | | |
|---|---|---|---|
| 1,796,763 | 3/1931 | Patterson | 269/32 |
| 2,352,632 | 7/1944 | Heyman | 294/88 |
| 2,426,095 | 8/1947 | Hecker | 269/32 X |
| 2,530,085 | 11/1950 | Shaff | 269/32 |
| 3,628,674 | 12/1971 | Koike et al. | 414/751 X |
| 3,951,271 | 4/1976 | Mette | 901/46 X |
| 4,260,187 | 4/1981 | Frosch et al. | 294/907 X |
| 4,341,067 | 7/1982 | Kondo et al. | 294/103.1 X |

FOREIGN PATENT DOCUMENTS 19674 1/1910 Norway ........................ 294/103.1

Primary Examiner—Johnny D. Cherry
Attorney, Agent, or Firm—Hill, Van Santen, Steadman & Simpson

[57] ABSTRACT

A gripper for a manipulation installation such as an industrial robot characterized by a gripping arrangement including a gripping element movable into a receiving bore to enable gripping a cylindrical part. In order to compensate for misalignment between the bore and the cylindrical part and for tilting of the part, the cylindrical bore is provided in a slidable member and has a frusto-conical opening facing toward the part to act as a centering bell so that upon engagement of the part with the surface of the frusto-conical opening the slidable member moves to the desired position to allow insertion of the part into the bore. To enable exact positioning of the part after it is grasped by the gripping arrangement and removed from a rack or storage facilities, the gripper includes a centering arrangement to precisely center the movable member in the housing.

15 Claims, 5 Drawing Figures

GRIPPER FOR A MANIPULATION DEVICE FOR AN INDUSTRIAL ROBOT

BACKGROUND OF THE INVENTION

The present invention is directed to a gripper of a manipulation device or installation particularly a device or installation used in an industrial robot. The gripper comprises a gripper housing and a clamping arrangement for frictionally engaging and gripping a part.

Grippers of the above mentioned type, which use a tong-like clamping device, are employed, for example, for a manipulation task in the case of handling parts according to a fixed program or for a freely programmable industrial robot. However, these known grippers are not suitable for gripping or seizing cylindrical parts. Thus, for example, shafts or other similar cylindrical parts, which are prepared and stored in racks with their longitudinal axis extending essentially perpendicular to the rack surface area, are difficult to seize by the gripper of an industrial robot. In view of the geometric data of the shaft, only a gripping via frictional engagement is thus possible. Due to the fabrication tolerances of the rack, due to the clearance between the shaft in the receiving bore of the rack which enables a relatively tipping of the shaft in the receiving bore and due to the attainable positional accuracy of the gripper of the industrial robot, position correctors of the gripper are necessary in order to guarantee reliable gripping of the shaft. However, such position corrections cannot be carried out with the known grippers.

SUMMARY OF THE INVENTION

The present invention is directed to a gripper for industrial robots with which the cylindrical ends or parts such as shafts, rotors and the like, which are prepared and presented in a rack, can be reliably seized.

This object is achieved in the case of an improvement of a gripper for a manipulating installation or parts handling device; particularly in industrial robots, said gripper having a housing and clamping means provided in the housing for frictionally gripping a part. The improvement comprises that said housing has a planar joint and a slidable member being movable along the planar joint, said clamping means including gripping means and a receiving bore in the slidable member with an axis extending transverse to the planar joint for receiving a part inserted from one side of the housing, said gripping means including a clamping element movable transverse to the axis of the bore and into the bore to grip a part inserted into the bore. In addition, the improvements include a locating means for locating the bore to receive a part including a conical centering bell in the member opening toward said one side of the housing and merging with the bore.

A gripper, which is designed in accordance with the invention and mounted on a flange of an industrial robot, can be vertically moved or lowered onto a cylindrical end of a part, which is stored in a rack in such a fashion that the conical centering bell incorporated in the slidable or movable member approaches the cylindrical end from above. A necessary position correction of the gripper is achieved in that the cylindrical end upon contacting the centering bell will exert a reaction force on the centering bell which force has a horizontal component that will shift the slidable member on the contact surface to such an extent that the cylindrical end can enter into the receiving bore and allow further lowering of the gripper. Upon this occurring, the clamping device arranged in the slidable member will clamp the cylindrical end of the part into the receiving bore to enable removal of the part from the rack. Thus, with the inventive gripper, the automatic position correction and a reliable gripping of the part is guaranteed.

According to a preferred embodiment of the invention, the slidable member can be brought into a reproducible position relative to the housing of the gripper with the aid of a centering device. The centering device can then be actuated before and after the gripping of a part. Preferably, the centering device consists of a centering cone which is arranged in the housing of the gripper and is capable of being lowered into a centering bore of the slidable member. The centering operation can then be conducted in a simple fashion by shifting the centering cone from an actuated position to an extended position.

In accordance with an additional preferred embodiment of the invention, the freedom of movement of the slidable member is limited by means which include an attachment or projection on the centering cone which attachment projects into the centering bore and also by a pin projecting into an oblong hole. It is expedient if the pin is mounted in the housing and projects into an oblong hole on the slidable member. In addition to a limitation of freedom of movement of the slidable member due to the pin being guided in the oblong hole, a possible twisting of the slidable member during the centering operation is also corrected.

The gripping means of the clamping means of the present invention is preferably operated by a toggle lever drive arrangement. Such a toggle lever drive arrangement has the advantage that a very high gripping force can be applied. In addition, the movement of the toggle lever can be limited to a position exceeding the over-center position by means of a limit stop so that the difference between the clamping position and the maximum stroke of the clamping element can be compensated by a prestressed spring. As soon as the toggle lever during actuation of the clamping device is moved even only slightly beyond the center position, it snaps into the clamping position which is limited by the limit stop. In this clamping position, the toggle lever is then further retained through the force of the prestress spring means or biasing means even in the case of failure of the energy necessary for the actuation of the clamping device or means. Thus, it can also be guaranteed that in case of an energy failure, which might occur during an emergency shutoff, the parts which have been seized by the gripper can no longer be released. This safety precaution is of great significance in view of the safety of human beings and machines and in view of the possible damage of the parts.

Preferably, the prestress spring means acts on a pressure piece which is positioned on the opposite side of the clamping element and projects into the receiving bore. The prestressed spring means is thus expediently designed in the form of a cup spring. Because of the pressure piece and the prestressed spring means, the necessary restraining forces can then be applied in a simple fashion.

Preferably, the clamping element or thrust piece which projects into the receiving bore has a prism-shaped recess aligned in the longitudinal direction of the receiving bore. Such a prism-shaped recess, upon seizing the cylindrical end of the part, provides a double linear contact and hence an improved support as well as defining the alignment of the cylindrical end during gripping. Instead of the clamping element, the pressure piece may have the recess.

In an additionally preferred embodiment of the invention, a sensor is mounted on the gripper housing above the receiving bore. Preferably an ultrasonic sensor is provided as the sensor. On the basis of the transit time of the echo of the ultrasonic signal, the sensor is then capable of determining at what relative distance to the sensor an object is positioned and thus determine the distance of an end of an object from the one side of the housing. It is thereby capable of distinguishing whether a position or space in the rack has a part or not. In addition, it is able to distinguish different lengths of parts disposed in a space of the rack. It is a particular advantage that the gripper need not first be lowered for this purpose such as is the case with other sensors which utilize inductive approximation switches.

DESCRIPTION OF THE PREFERRED EMBODIMENTS

Figure 1:
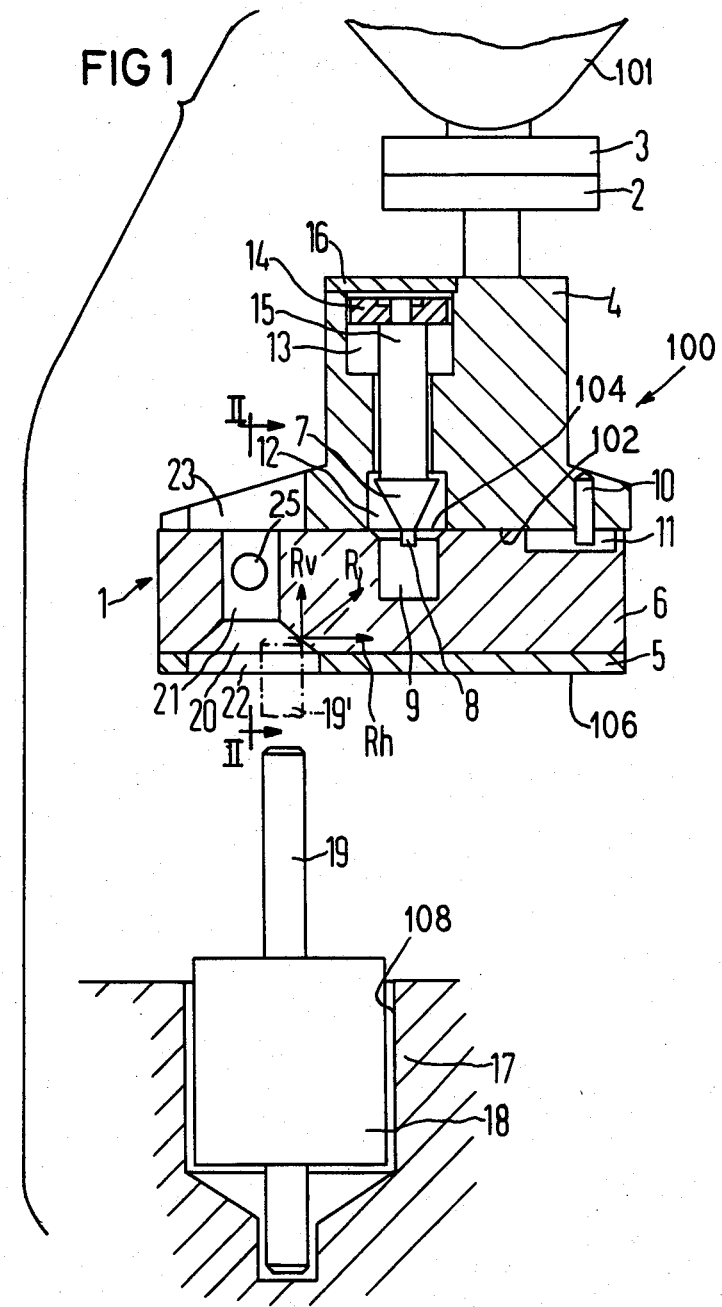
FIG. 1 is a longitudinal cross-sectional view of portions in elevation of a gripper in accordance with the present invention.

The principles of the present invention are particularly useful in a gripper generally indicated at 100 in FIG. 1. As illustrated, the gripper 100 has a housing 1 with a flange 2 which enables it to be connected to a flange 3 of an industrial robot 101. The gripper housing 1 consists of an upper portion 4 and a lower portion 5 which are interconnected together and form a planar joint or pathway such as 102 on which a slidable member 6 is free to move. As illustrated, the sliding member 6 can execute two sliding movements and one rotational movement relative to the housing 1 with a degree of freedom of F=3. The horizontal freedom of movement of the slidable member 6 is limited by a cylindrical pin or nose 8 of a center cone 7, which nose 8 projects into a center bore 9 of the slidable member 6. In addition, the upper portion 4 of the housing 1 has a pin 10 which projects into an oblong hole or recess 11 in the slidable member 6. By lowering the center cone 7 from a retracted position to an extended position, it extends into a respective center bore 9 to produce a clear and reproducible position for the slidable member 6 relative to the housing 1. Preferably, the cone 7 engages a conical edge or countersink 104 of the bore 9. The center cone 7 is disposed in its retracted or rest position in a bore 12 of the upper section 4. The lowering of the center cone 7 is accomplished pneumatically by means of a piston 14, which is received in a cylindrical bore 13 and has a piston rod 15 that is directly connected with an upper surface of the center cone 7. The upper end of the cylindrical bore 13 is sealed by a cover 16. It should be noted that the center cone 7 has a frusto-conical shape that terminates in the nose 8. It is also noted that when the center cone is in the retracted position as illustrated, the nose 8 still projects into the bore 9 to limit the amount of lateral movement of the member 6 along the planar joint 102.

As illustrated in FIG. 1, the gripper 100 is positioned above a rack 17, which has a position or recess 108 containing a part such as a rotor 18 having a cylindrical shaft 19. Due to the fabrication tolerances of the recess 108 of the rack 17, and due to the clearance between the rotor 18 and the recess or receiving bore 108 of the rack, the rotor 18 can be tipped relative to the axis of the bore 108. In addition, due to the positional accuracy of the gripper 100 of the industrial robot, for reliable gripping of the cylindrical end or shaft 19 of the part or rotor 18, a position correction of the gripper 100 is necessary. This position correction is accomplished by locating means. The gripper 100 as part of the gripping means has a receiving bore 21 extending through the movable part 6 with the axis of the bore 21 being perpendicular to the planar joint 102 and the horizontal direction. As illustrated, the bore 21 terminates adjacent a side 106 which faces the part 18 with a centering bell 20 which has a conical diverging shape. The lower section or portion 5 of the housing 1 has an opening 22 which has a diameter equal to the enlarged diameter of the bell 20. In a similar manner, the upper portion 4 of the housing has a bore 23 of the same diameter which is also aligned with the bore 22.

With vertical movement to lower the gripper housing 1, the centering bell 20 will move in the direction of the cylindrical end 19 of the rotor 18 disposed in the rack 17. Upon contacting the centering bell 20 as illustrated by the broken line portion 19', a reaction force R will be applied to the centering bell and has a horizontal component Rh and a vertical component Rv. The horizontal component Rh of the reaction force R causes the movable element 6 to be shifted to such an extent that the cylindrical end 19 can enter into the receiving bore 21. Depending upon the length of the cylindrical end 19, it can enter the bore 21 and also extend into the bore 23. After entry of the cylindrical end 19 into the receiving bore 21, a clamping device is actuated and the cylindrical end is securely clamped in the receiving bore 21. As the cylindrical end 19 moves into the bore 21, a reaction force will be applied to attempt to align the cylindrical end 19 to be on the same axis as the bore 21. In addition, the clamping of the cylindrical end 19 in the bore 21 by the clamping device will act to move the part from any tilted relationship to an upstanding position with the axis of the part 19 being substantially perpendicular to the planar joint 102 of the movable part 6. With the rotor 18 clamped in the movable part 6 and being positioned perpendicularly in the rack element 17, it is free of any lateral forces which were caused by tilting of the part in the bore 108. Through a vertical upward movement of the housing 1, the rotor 18 will then be lifted from the recess 108 of the rack 17. Once the element is lifted clear of the recess 108 in the rack 17, the pneumatic actuation of piston 14 will cause the center cone 7 to be lowered into the center bore 9 to shift the movable element 6 to the predetermined position and to establish the position of the part such as the rotor 18 relative to the housing 1.

Figure 2:
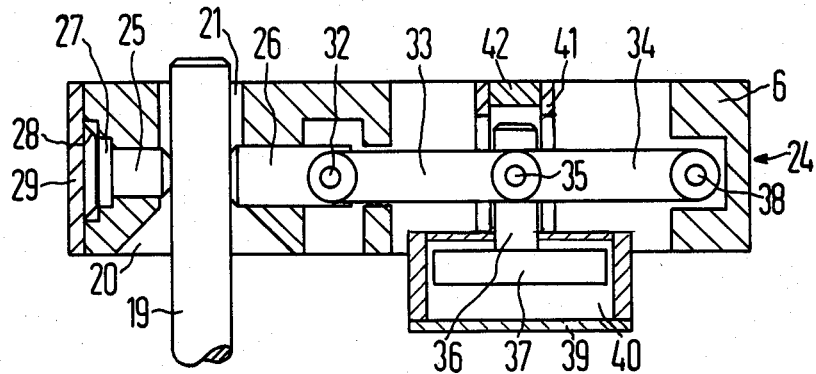
FIG. 2 is a cross-sectional view of a movable plate of the gripper in accordance with the present invention taken along a line II—II of FIG. 1.

In order to clamp a part such as the cylindrical shaft 19 in the opening or bore 21, the clamping means includes a gripping means generally indicated at 24 (FIG. 2) which is provided in sliding element 6. The sliding element 6 has a thrust piece 25 which extends on an axis which is perpendicular to the axis of the receiving bore 21 and is urged into the bore 21 by a spring means. Preferably, the thrust piece 25 will extend approximately 0.1 mm into the receiving bore 21 and coacts with a clamping element 26 of a toggle drive arrangement. The thrust piece 25 is guided in a stepped bore and has a head 27 which limits its penetration into the bore 21. Acting on the head 27 is a cup spring 28 which is prestressed by a cover 29 which is tightly screwed onto the movable or sliding member 6.

Figure 3:
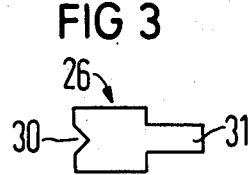
FIG. 3 is a plan view of a gripper element utilized in the present invention.

As is apparent in FIG. 3, the clamping element 26 is provided on its end face with a prism-shaped recess 30 for the purpose of defining alignment of the cylindrical end 19 during a gripping or clamping operation. The opposite end region 31 of the cylindrical clamping element 26 is milled on both sides. This end region 31 is then pivotally connected by a bolt 32 (FIG. 2) to a bifurcated end of a first toggle lever 33. The other end of the first toggle lever 33 together with a corresponding unit of a second toggle lever 34 are interconnected by a bolt 35 which also pivotally connects them to a piston rod 36 of a piston 37. The other end of the second toggle lever 34 is mounted for pivotal movement around a fixed axis by a bolt or pin 38 which is secured on the slidable member 6. To actuate the entire toggle lever drive, a piston 37, which is a pneumatic piston that is guided in a bore 40 that is sealed by a plate 39, is actuated. The piston rod 36 is received in a cylindrical guide 41 and is limited in its upward movement by an upper limit stop 42. The entire toggle lever drive arrangement is illustrated in the center position with the maximum stroke for the element 26 and it is noted that the limit stop 42 limits movement to a given amount past the center position to an over-center position. The path of the toggle lever connection of pin 35 beyond the center position, which is greatly exaggerated in FIG. 2, in reality only amounts to approximately 0.5 mm.

Figure 4:
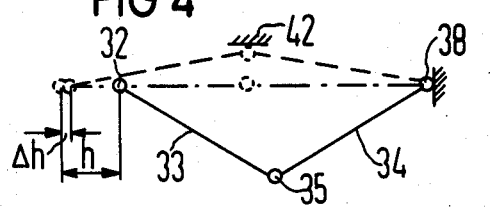
FIG. 4 is a diagrammatic presentation of the toggle lever drive arrangement of the device of FIG. 2.

For a precise description of the function of the toggle lever drive arrangement reference is made to FIG. 4, where it is schematically illustrated. In this illustration, the two toggle levers 33 and 34 plus their pivotal connection formed by the bolts or pins 32, 35 and 38, as well as the limit stop 42, are schematically illustrated. The lower initial position of the toggle lever drive is indicated in heavy black lines. From this lower position a center position with a maximum stroke h for the clamping element 26 is illustrated in dot-dash lines. In this position, it is assumed that the thrust piece 25 will be pressed back against the spring 28 but not to such an extent that the cylindrical end 19 touches the wall of the receiving bore 21. Upon a further upward stroke of the piston 37, the toggle lever drive arrangement will then reach the upper end position or overcenter position which is limited by the stop 42 and this position is illustrated by broken lines in FIG. 4. In this upper position, the stroke of the clamping element 26 again moves back by an amount of Δh. This difference Δh between the clamping position of the upper end position and the maximum stroke h in the center position is compensated by a corresponding movement of the cup spring 28. The force of the prestressing cup spring 28, however, is still sufficiently great that in case of a failure of the compressed air charge on the piston 37, the piston rod 36 continues to be thrust or held against the upper limit stop. Thus, the cylindrical end 19 remains clamped in the slidable member 6 even after failure of the compressed air.

From FIG. 4 it can be additionally seen that the bolt or connection 35 of the toggle lever 36 is laterally deflected during the stroke of the piston 37. This lateral deflection or movement, which has been exaggerated in the illustrated embodiment and in reality is extremely minor, is rendered possible by virtue of the fact that the bolt 35 is arranged in a horizontally aligned oblong hole of the piston rod 36 which oblong hole is not illustrated in the drawings.

Figure 5:
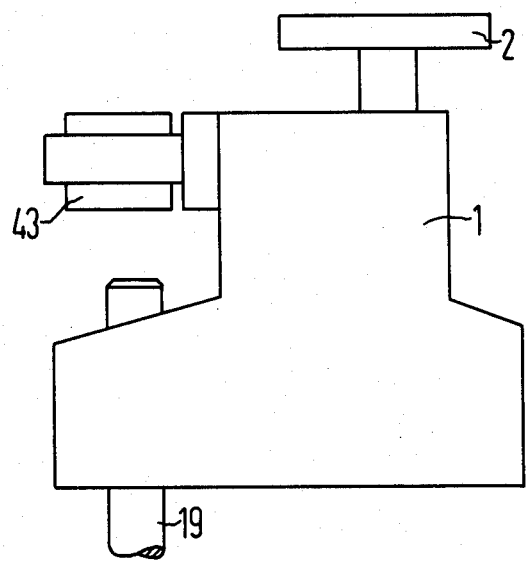
FIG. 5 is an embodiment of the gripper according to FIG. 1 with a sensor.

Another feature of the gripper in accordance with the present invention is that the gripper housing 1 is provided with a sensor 43 (FIG. 5). As illustrated, the sensor is secured above the clamped-in cylindrical end 19 and is designed as an ultrasonic sensor. On the basis of the transit time of an echo of the ultrasonic signal, the sensor 43 is capable of distinguishing if the rack position or recess 108 of the rack 17 contains a rotor such as 18. In addition, if a rotor of a different length was disposed in the recess 108, the sensor would also detect this change. Since the operating distance of the ultrasonic transducer amounts to approximately 20 to 30 cm, the gripping housing 1 need not first be lowered for this determination to be accomplished. It should be pointed out that the sensor 43 is a conventional ultrasonic sensor.

Although various minor modifications may be suggested by those versed in the art, it should be understood that we wish to embody within the scope of the patent granted hereon, all such modifications as reasonably and properly come within the scope of our contribution to the art.

We claim:

1. In a gripper for a manipulation installation particularly on an industrial robot, said gripper having a housing and clamping means for frictionally gripping a part, the improvements comprising said housing having a planar joint and a slidable member being movable along the planar joint, said clamping means including gripping means and a receiving bore in the slidable member with an axis extending transverse to the planar joint for receiving a part inserted from one side of the housing, said gripping means including a clamping element movable transverse to the axis of the bore and into the bore to grip a part inserted into the bore; and said gripper means including locating means to shift the member for positioning the bore to receive a part including a conical centering bell in the member opening toward said one side of the housing and merging with the bore.

2. In a gripper according to claim 1, which includes centering means for positioning the slidable member in a reproducible position relative to the housing.

3. In a gripper according to claim 2, wherein the centering means consist of a center cone mounted for reciprocation in the gripper housing and being movable between a retracted position into engagement in a center bore of the slidable member to cause movement of the member to a predetermined position.

4. In a gripper according to claim 3, which includes means for limiting the freedom of movement of the slidable member including a nose projecting from the center cone into the center bore of the slidable member and a pin projecting into an oblong hole.

5. In a gripper according to claim 4, wherein the pin is mounted on the housing of the gripper and projects into an oblong hole provided on the slidable member.

6. In a gripper according to claim 2, wherein the clamping element is moved into the receiving bore by a toggle lever drive arrangement.

7. In a gripper according to claim 6, which includes sensor means mounted on the gripper housing above the receiving bore for determining the presence of a part beneath the one side and the distance of the end of the part from said one side.

8. In a gripper according to claim 6, wherein the movement of the toggle lever drive arrangement past an over-center position is limited by a limit stop and wherein the gripping means include a thrust piece extending into the receiving bore opposite the clamping element and being urged toward the clamping element by a spring to compensate for the difference between the over-center position and the maximum stroke of the clamping element during a clamping operation.

9. In a gripper according to claim 1, wherein the gripping means include a toggle lever drive arrangement for moving the clamping element into a clamping position.

10. In a gripper according to claim 9, wherein the toggle lever drive arrangement includes a limit stop to limit an over-center position for the arrangement and said toggle drive arrangement includes biasing means for compensating for the difference between the clamping position and the maximum stroke of the clamping element.

11. In a gripper according to claim 10, wherein said biasing means include a thrust piece projecting into the receiving bore opposite to the clamping element and a prestressed spring urging the thrust piece toward said clamping element.

12. In a gripper according to claim 11, wherein the end of one of the clamping element and thrust piece has a prismshaped recess aligned in the axial direction of the receiving bore.

13. In a gripper according to claim 9 in which a sensor is mounted on the housing of the gripper above the receiving bore to determine the presence of a part and the distance of the end of the part from the one side.

14. In a gripper according to claim 1, which includes a sensor being mounted on the gripping housing above the receiving bore to determine the presence of a part beneath the receiving bore.

15. In a gripper according to claim 14, wherein the sensor is an ultrasonic sensor and determines the distance of the end of the part from said one side.

* * * * *